United States Patent
Etemad et al.

(10) Patent No.: US 8,054,783 B2
(45) Date of Patent: Nov. 8, 2011

(54) SYSTEM AND METHOD FOR DIVIDING SUBCHANNELS IN A OFDMA NETWORK

(75) Inventors: Kamran Etemad, Potomac, MD (US); Masoud Olfat, Clarksville, MD (US)

(73) Assignee: Nextel Communications Inc., Reston, VA (US)

( * ) Notice: Subject to any disclaimer, the term of this patent is extended or adjusted under 35 U.S.C. 154(b) by 1581 days.

(21) Appl. No.: 11/197,450

(22) Filed: Aug. 5, 2005

(65) Prior Publication Data

US 2006/0050627 A1 Mar. 9, 2006

Related U.S. Application Data

(60) Provisional application No. 60/599,022, filed on Aug. 6, 2004.

(51) Int. Cl.
*H04W 4/00* (2009.01)
*H04J 11/00* (2006.01)

(52) U.S. Cl. .................. 370/329; 370/208

(58) Field of Classification Search .......... None
See application file for complete search history.

(56) References Cited

U.S. PATENT DOCUMENTS

| | | | |
|---|---|---|---|
| 6,259,722 B1* | 7/2001 | Dicker et al. | 375/132 |
| 7,177,275 B2* | 2/2007 | Stanwood et al. | 370/230 |
| 7,272,162 B2* | 9/2007 | Sano et al. | 375/135 |
| 7,400,898 B2* | 7/2008 | Kang et al. | 455/518 |
| 2002/0126740 A1* | 9/2002 | Giannakis et al. | 375/143 |
| 2002/0191568 A1* | 12/2002 | Ghosh | 370/335 |
| 2003/0021245 A1* | 1/2003 | Haumonte et al. | 370/330 |
| 2003/0039302 A1* | 2/2003 | Castelain et al. | 375/147 |
| 2003/0043928 A1* | 3/2003 | Ling et al. | 375/267 |
| 2003/0087603 A1* | 5/2003 | Li et al. | 455/63 |
| 2003/0156672 A1* | 8/2003 | O'Shea et al. | 375/365 |
| 2004/0066740 A1* | 4/2004 | Suh et al. | 370/208 |
| 2004/0081123 A1* | 4/2004 | Krishnan et al. | 370/329 |
| 2004/0264507 A1* | 12/2004 | Cho et al. | 370/480 |
| 2005/0013279 A1* | 1/2005 | Hwang et al. | 370/343 |
| 2005/0025039 A1* | 2/2005 | Hwang et al. | 370/206 |
| 2005/0030931 A1* | 2/2005 | Sung et al. | 370/342 |
| 2005/0036481 A1* | 2/2005 | Chayat et al. | 370/351 |
| 2005/0058058 A1* | 3/2005 | Cho et al. | 370/208 |
| 2005/0058212 A1* | 3/2005 | Shao | 375/260 |
| 2005/0094597 A1* | 5/2005 | Hwang et al. | 370/329 |
| 2005/0147079 A1* | 7/2005 | Lakkis | 370/350 |
| 2005/0152473 A1* | 7/2005 | Maltsev et al. | 375/299 |
| 2005/0163082 A1* | 7/2005 | Sudo | 370/335 |
| 2005/0195885 A1* | 9/2005 | Misra et al. | 375/130 |
| 2005/0207334 A1* | 9/2005 | Hadad | 370/203 |
| 2005/0220200 A1* | 10/2005 | Giannakis et al. | 375/260 |
| 2006/0067207 A1* | 3/2006 | Miyoshi | 370/210 |

(Continued)

OTHER PUBLICATIONS

Leiba et al., Mini-subchannel support for OFDMA PHY mode, Apr. 15, 2004, IEEE 802.16 Task Group d Contributed Document IEEE C802.16d-04/69.*

(Continued)

*Primary Examiner* — Gary Mui
*Assistant Examiner* — Clemence Han

(57) ABSTRACT

A system and method for multiplexing subchannels in an OFDMA network is provided. The subchannels can be multiplexed by splitting the subchannels in the frequency domain. Alternatively, the subchannels can be code division multiplexed using N orthogonal spreading codes. The subchannel multiplexing increases system capacity for low-rate services, such as voice-based services.

11 Claims, 4 Drawing Sheets

U.S. PATENT DOCUMENTS

2007/0064641 A1* 3/2007 Laroia et al. .................. 370/320
2008/0039107 A1* 2/2008 Ma et al. ....................... 455/450
2008/0259903 A1* 10/2008 Lim et al. ...................... 370/349
2010/0195545 A1* 8/2010 Sadowsky et al. ............ 370/280

OTHER PUBLICATIONS

International Search Report and Written Opinion dated Sep. 15, 2007 in PCT/US05/27886.

* cited by examiner

SYSTEM AND METHOD FOR DIVIDING SUBCHANNELS IN A OFDMA NETWORK

The present application claims priority under 35 U.S.C. §119(e) from U.S. Provisional Application No. 60/599,022, filed Aug. 6, 2004, the entire disclosure of which is herein expressly incorporated by reference.

BACKGROUND OF THE INVENTION

Currently most broadband orthogonal frequency division multiple access (OFDMA) wireless access technologies are designed to support high-speed packet data traffic. Accordingly, these technologies typically allocate high-rate data subchannels designed to support non-real time high-speed packet data traffic. Although many operators would like to exploit these technologies by offering real-time, low-rate, voice-based services, there are a number of unresolved issues related to the use of high-speed channels for low-rate voice services.

One issue is the low granularity of data channels. This results in waste of symbols for low-rate traffic and a shortage in number of traffic channels when large number of mobile stations are to be supported. Specifically, in scalable OFDMA systems where multiple Fast Fourier Transform (FFT) sizes are defined, but the subcarrier spacing remains constant, the number of definable traffic subchannels may be very small for lower FFT sizes. For example, when the channel bandwidth is 1.25 MHz there are only two subchannels per symbol. Accordingly, only a few bursts can be supported per frame.

Another issue is achieving low latency transmission for delay sensitive signaling and voice traffic. Low latency requires mobile stations to have transmission opportunities in almost every frame. However, this reduces the number of supportable active mobile stations.

Using low-rate voice and signaling channels in a make-before-break soft handoff, needed for delay sensitive traffic, causes challenges associated with synchronized scheduling of channels by two base stations involved in the soft handoff, and the interference management when frequency reuse factor is one.

One technology that uses OFDMA is the IEEE 802.16e standard. Except in broadcast or multicast scenarios, and contention-based ranging, the current OFDMA sub-channnlization defined in the IEEE 802.16e standard does not allow two or more users to share the same data channel on a time division basis. Accordingly, the current OFDMA sub-channelization defined in IEEE 802.16e lacks the flexibility to provide a large number of low-rate traffic channels (or large number of mobile stations receiving low-rate signaling traffic channels), especially those which are close to the base station.

SUMMARY OF THE INVENTION

Exemplary embodiments of the present invention are directed to methods and apparatus for multiplexing subchannels in a OFDMA network. The subchannels can be multiplexed by splitting them in the frequency domain or by employing code division multiplexing within each subchannel. Multiplexing subchannels in the manner described herein allows an OFDMA network to efficiently support a number of low-rate mobile stations, such as voice terminals, in a number of high-rate subchannels.

Other objects, advantages and novel features of the present invention will become apparent from the following detailed description of the invention when considered in conjunction with the accompanying drawings.

DETAILED DESCRIPTION OF THE PREFERRED EMBODIMENTS

In accordance with exemplary embodiments of the present invention, multiple low-rate data or signaling channels are multiplexed in a subchannel defined within an OFDMA frame. This creates a framework to define a larger number of traffic channels, which can efficiently carry low-rate data and signaling channels, and can reliably be used in soft handoff.

Figure 1A:
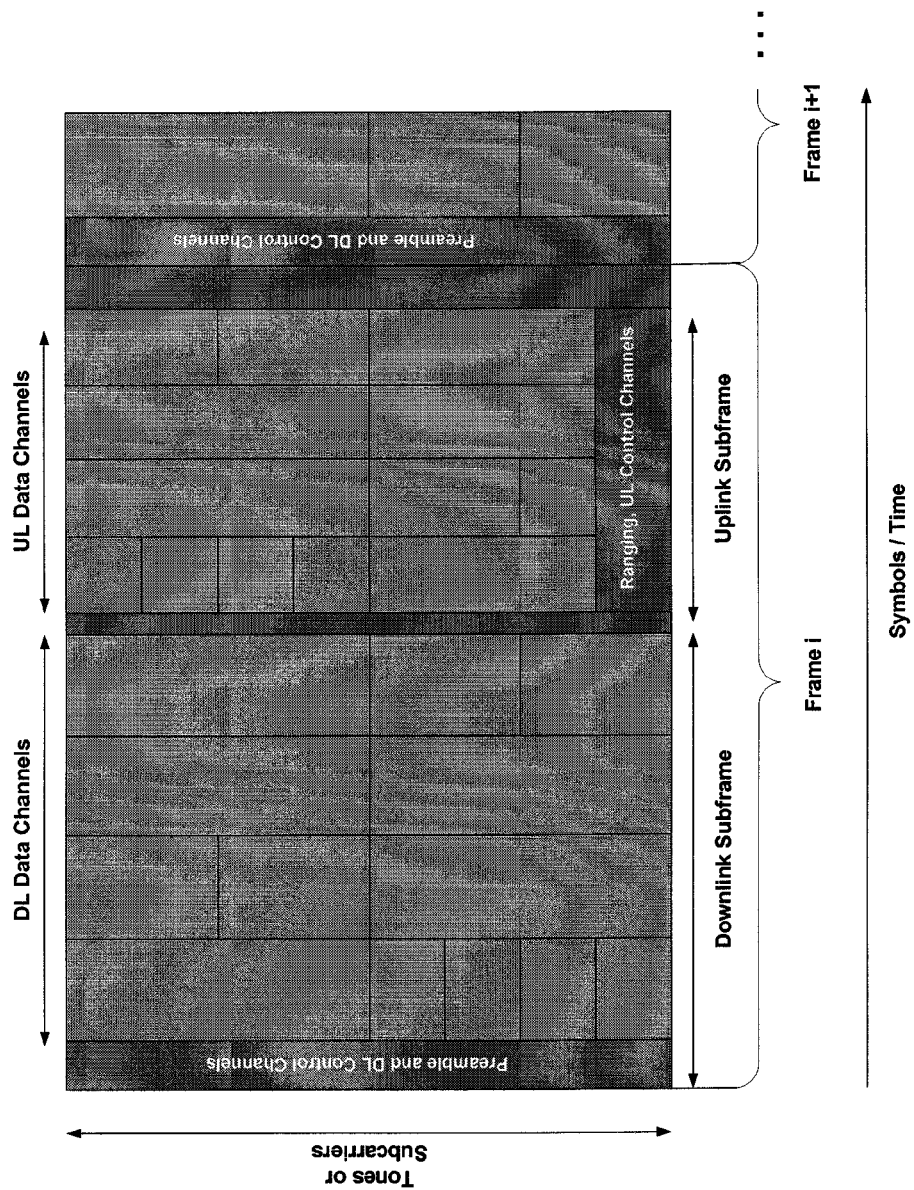
FIGS. 1A and 1B illustrate exemplary OFDMA/TDD frames.
Figure 1B:
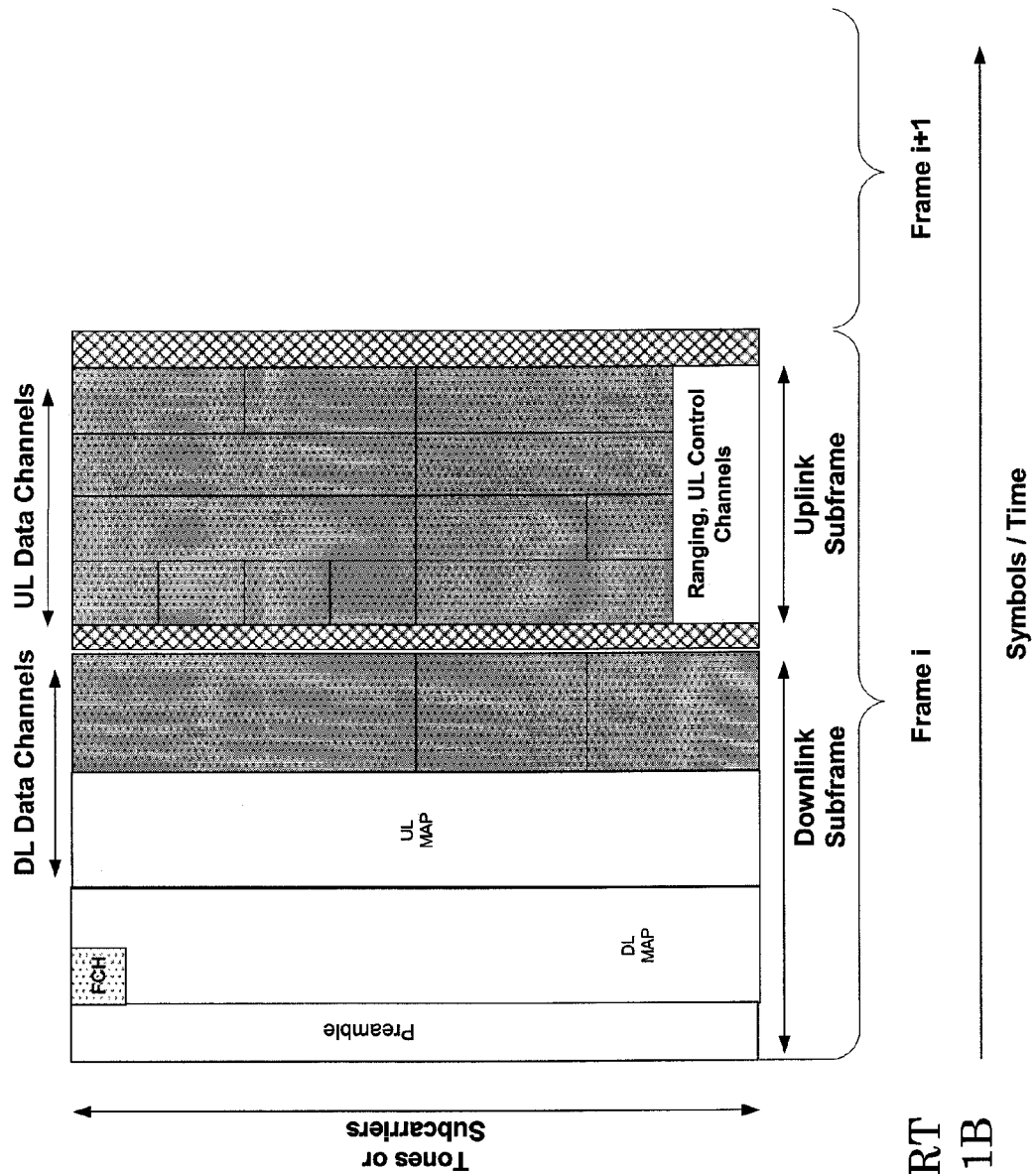

FIGS. 1A and 1B illustrate exemplary TDD frame structures in accordance with the present invention. The frame structure comprises downlink and uplink subframes. The downlink subframe starts with a preamble immediately followed by Frame Control Header (FCH), and other broadcast control messages. The downlink MAP (DL_MAP) and uplink MAP (UL_MAP) follow the FCH and other broadcast messages. The remaining symbols are used for user data. The tones or subcarriers on each OFDMA symbol are grouped into subchannels and a combination of subchannels is allocated over one or more symbols to one (or a group of) user(s) for data transmission. Similarly the uplink subframe consists of control and traffic channels.

Typically, the size of subchannels and traffic channels are defined to fit large payloads to efficiently support high-speed packet data channel. The traffic channels are allocated through the DL_MAP and UL_MAP by specifying the subchannel and associated symbol indexes.

The current IEEE 802.16-2004 draft defines mini-subchannels in the uplink. In this case one, three or six subchannels are concatenated, and the tiles of this concatenation are allocated to multiple mobile stations. This feature allows more than one mobile station, but it is defined only for the uplink. Moreover, this was not designed to assign a lower granularity than one subchannel per one mobile station. In other words, if "n" subchannels are concatenated, "n" mini-subchannels are created by using the tiles within the concatenation and each mini-subchannel is assigned to one mobile station.

In accordance with exemplary embodiments of the present invention, each subchannel is further divided into smaller channels to support smaller data and medium access control (MAC) messaging payloads more effectively. The smaller channels can be achieved by splitting subchannels in the frequency domain or by employing code division multiplexing within each subchannel.

One conventional technique for supporting low-rate traffic is to allocate the same OFDMA symbol in every other N frames to a mobile station. This approach provides full frequency diversity, but increases the latency by a factor of N, and requires buffering of data/voice. Due to the low delay requirements of voice, buffering may introduce undesirable delays.

In accordance with exemplary embodiments of the present invention, a subchannel can be sub-divided into N smaller channels using one of the two embodiments described below.

Figure 2:
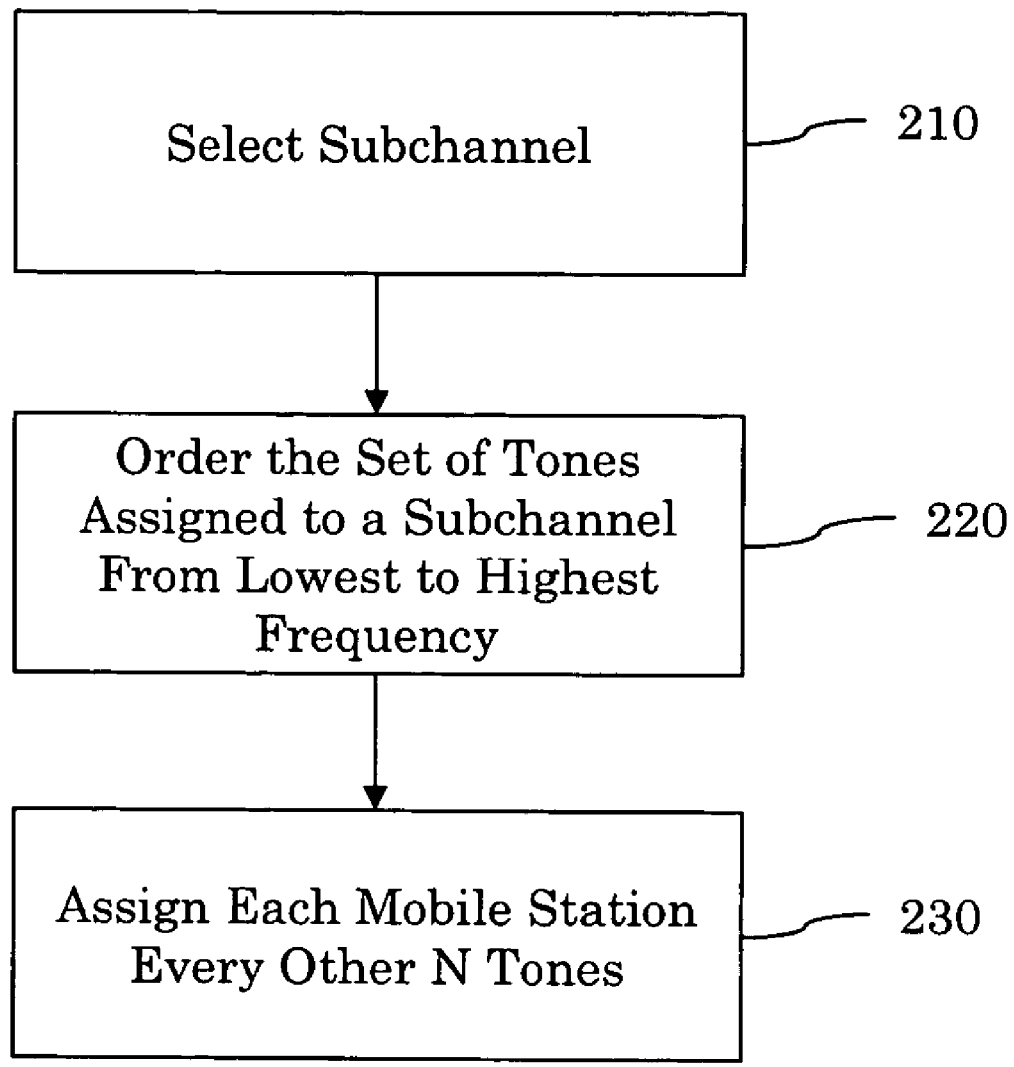
FIG. 2 illustrates an exemplary method for dividing OFDMA subchannels in accordance with one embodiment of the present invention.

FIG. 2 illustrates an exemplary method for dividing OFDMA subchannels in accordance with one embodiment of the present invention. In accordance with this embodiment, subchannels are split in the frequency domain to create N smaller channels. A base station, or other channel allocation entity, selects a subchannel (step 210), and orders the set of tones assigned to the subchannel from the lowest to highest frequency (step 220). The base station then assigns each mobile station every other N tones of the subchannel (step 230). Accordingly, in this embodiment of the present invention, each mobile station obtains an opportunity to transmit and receive in every frame. This embodiment supports more low-rate traffic channels in the same OFDMA frame without increasing the latency, but with a slightly reduced frequency diversity. The index, i=1, . . . N, of which subset of tones each mobile station should employ can be specified as part of channel assignment.

Figure 3:
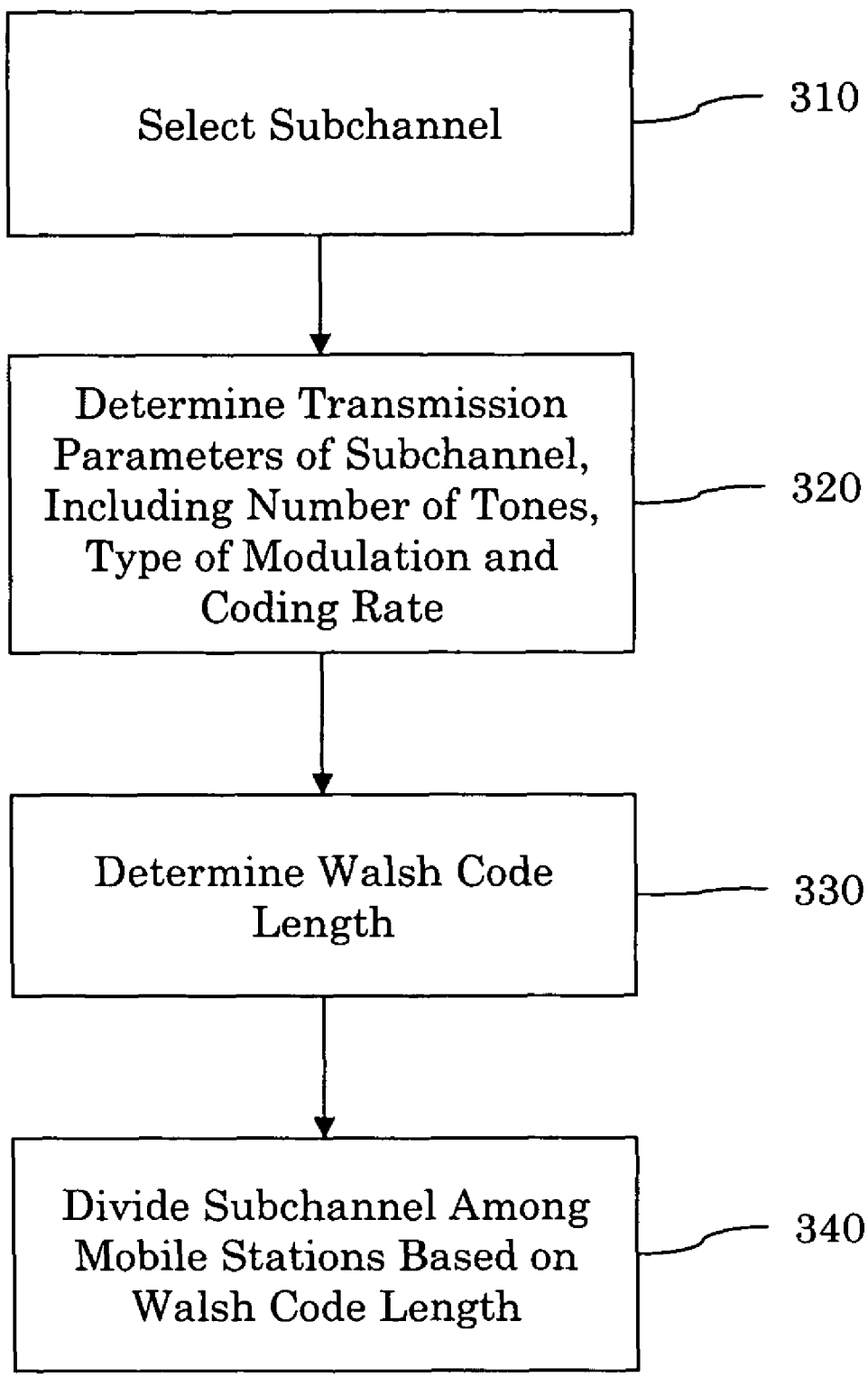
FIG. 3 illustrates an exemplary method for dividing OFDMA subchannels in accordance with another embodiment of the present invention.

FIG. 3 illustrates an exemplary method for dividing OFDMA subchannels in accordance with another embodiment of the present invention. In this embodiment, N channels are code division multiplexed using N orthogonal spreading codes. Specifically, a base station, or other channel allocation entity, selects a subchannel (step 310), and determines transmission parameters of the subchannel, including the number of tones, type of modulation and coding rate (step 320). The base station, or other channel allocation entity, determines a Walsh Code length (step 330) and divides the subchannel among mobile stations based on the determined Walsh Code length. (step 340). The code division multiplexing is a simple approach from addressing perspective, and it provides maximum frequency diversity without increasing the latency. The code division multiplexing also provides better interference management, especially in handoff regions.

Consider, for example, a network where each subchannel has 48 tones and 1 symbol, with 64 QAM modulation and coding rate of ⅔ (appropriate for the subscribers close to a base station), and a frame size of 5 msec. In this case, a single subchannel can carry a rate of 38.4 kbps. The symbols can be spread by a Walsh code of length 4 to reduce the rate to 9.6 kbps. Using the orthogonal Walsh codes of length 4 allows four users to share the same subchannels with maximum frequency diversity.

The same feature could be defined for a slot, where a slot is defined as a rectangular area consisting of one subchannel in the frequency domain, and one or more OFDMA symbols in the time domain.

An example is a system with a 12-tone subchannel or traffic channel segments using QPSK modulation and ½ rate coding to transmit 14 symbols over 11.3 msec super slots. In this system the data rate for this channel is about 120 kbps. A Walsh code of length 8 can be used to divide the channel capacity and share it among 8 users.

One can also use orthogonal Walsh codes of different lengths depending on the payload size, coding and modulation rate. This increases the number of supported users, and therefore increases cell capacity.

In some cases there may be traffic channels with lower coding rate or modulation order that can be used to reduce the data rate. However, using those options just to create a lower rate channel reduces spectral efficiency.

The two embodiments described above require a change in the block size of channel encoders. This can be considered as an optional feature in a network without affecting the overall signaling and channelization. Specifically, the Walsh code to be used can be specified with few additional bits, in this example 2 bits, in the channel assignment message, or uplink/downlink MAP in IEEE 802.16 frames. The modulation and FFT process does not change, and in the code division multiplexing embodiment the network only adds an orthogonal spreading/despreading between the coding and modulation phase.

Although the present invention has been described in connection with a IEEE 802.16e TDD network, the present invention is equally applicable to other OFDMA based systems, such as Flash-OFDM designed by Flarion Technologies Inc., and IEEE 802.16 FDD technologies.

The methods have been described above in connection with a base station or other channel allocation entity. It should be recognized that the base station or other channel allocation entity can include logic for performing the methods described above. The logic can be a processor and memory, where the processor is a microprocessor, field programmable gate array (FPGA), application specific integrated circuit and/or the like, and the memory can be any type of static or random access memory. Similarly, a mobile station can include logic for receiving the divided subchannel allocations, and transmitting and receiving using the divided subchannels.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of communicating over a low-rate channel which is multiplexed with a plurality of low-rate channels in subchannels of orthogonal frequency division multiple access (OFDMA) frames, the method comprising the acts of:
   receiving, by a mobile station, an OFDMA downlink subframe, the subframe including a channel assignment for access to an uplink subframe;
   determining which channel within a subchannel is assigned to the mobile station; and
   transmitting low-rate information in the assigned channel within the subchannel, wherein the channel within the subchannel comprises a portion of frequencies assigned to the subchannel, and,
   wherein the portion of the subchannel frequencies are selected based on the acts of
      ordering a set of tones assigned to the subchannel from lowest to highest frequency; and
      assigning every other Nth tone of the ordered tones assigned to the subchannel to the mobile station.

2. A method of communicating over a low-rate channel which is multiplexed with a plurality of low-rate channels in subchannels of orthogonal frequency division multiple access (OFDMA) frames, the method comprising the acts of:
   receiving, by a mobile station, an OFDMA downlink subframe, the subframe including a channel assignment for access to an uplink subframe;
   determining which channel within a subchannel is assigned to the mobile station; and
   transmitting low-rate information in the assigned channel within the subchannel, wherein the channel within the subchannel is defined by one orthogonal spreading code of a set of orthogonal spreading codes, wherein the set of orthogonal spreading codes includes N orthogonal spreading codes, and low-rate information is multiplexed into N channels within the subchannel.

3. The method of claim 2, wherein the orthogonal spreading codes have a length of N.

4. A method of communicating between a mobile station and a base station, comprising the acts of:
   - selecting an orthogonal frequency division multiple access (OFDMA) subchannel;
   - ordering tones assigned to the subchannel from a lowest to highest in frequency; and
   - respectively assigning every other Nth tone of the ordered tones assigned to the subchannel to N mobile stations independent of assignments of tones for the N mobile stations in subchannels other than the subchannel.

5. The method of claim 4, further comprising the act of:
   transmitting information to one of the N mobile stations over the tones of the subchannel assigned to the one of the N mobile stations.

6. The method of claim 4, wherein the tones of the subchannel are assigned for voice communications.

7. A method of communicating between a base station and a mobile station, comprising the acts of:
   - selecting, by a base station, an orthogonal frequency division multiple access (OFDMA) subchannel;
   - determining a length of a spreading code; and
   - dividing, by the base station, the subchannel between N mobile stations based on the determined length of the spreading code, wherein the number of mobile stations N is equal to the determined length of the spreading code.

8. The method of claim 7, wherein the spreading code is a Walsh code.

9. The method of claim 7, further comprising the act of:
   determining transmission parameters of the subchannel.

10. The method of claim 9, wherein the transmission parameters include a number of tones, type of modulation and coding rate.

11. The method of claim 7, wherein the divided subchannel carries voice information.

\* \* \* \* \*